Jan. 9, 1923.

A. J. LIEDTKE.
TRACTOR.
FILED MAR. 21, 1921.

1,441,232

A. J. Liedtke.
INVENTOR.

Patented Jan. 9, 1923.

UNITED STATES PATENT OFFICE.

ARTHUR J. LIEDTKE, OF WEST ALLIS, WISCONSIN.

TRACTOR.

Application filed March 21, 1921. Serial No. 454,099.

*To all whom it may concern:*

Be it known that I, ARTHUR J. LIEDTKE, a citizen of the United States, residing at West Allis, in the county of Milwaukee and State of Wisconsin, have invented a new and useful Tractor, of which the following is a specification.

My invention relates in general to improvements in the construction and operation of vehicles such as tractors, which are especially adapted to transport devices such as agricultural and other earth working implements along the ground.

An object of my invention is to provide simple and compact means for enabling efficient operation of a combined tractor and implement, without necessitating constant direct observance of both of the devices forming the combined unit.

It has been found in certain classes of traction service such as the cultivation of corn and the like vegetation arranged in relatively uniform rows, with the aid of a motor propelled tractor drawn cultivator, that it is practically impossible for a single individual to simultaneously steer the tractor so as to keep it properly positioned between the rows of plants, and to maintain the cultivator shovels in the desired proximity to the plants. When the operator of the present commercial cultivator tractors, directs his attention to manipulation of the vehicle guiding wheels, the cultivator shovels are often displaced sufficiently to either uproot some of the plants or to treat the soil at too great a distance from the plant roots. When the attention of the operator is directed toward the cultivator shovels, the tractor wheels often run into the rows either because of displacement of the tractor guiding wheels by obstructions in their path, or due to irregularities in the plant rows, thereby causing the tractor wheels to crush or to otherwise damage the plants. This objection exists both in the type of tractor wherein the operator rides with the vehicle, as well as in the type where the operator walks behind the tractor and the implement, and has proven a serious obstacle confronting the exploitation of tractors for cultivating and for similar service.

A more specific object of my invention is to provide means for eliminating these prior difficulties and for enabling a single individual to manipulate a tractor of either of the aforementioned types, without danger of injuring the plants. My invention comprises a simple, compact and neat attachment which is readily applicable to most of the present commercial tractors, and whereby changes in the position of the tractor guiding wheels is automatically and instantly indicated by observance of the cultivator shovels alone, and reversely, whereby changes in the position of the cultivator shovels is automatically and instantly indicated by observance of the tractor guiding means alone. These and other objects and advantages accruing from my invention and the mode of their attainment, will be apparent from the accompanying description.

In describing one embodiment of my invention and its mode of operation in detail, reference may be had to the accompanying drawing forming a part of this specification, wherein like reference characters denote the same or similar parts in the several views, and in which:—

Figure 1:
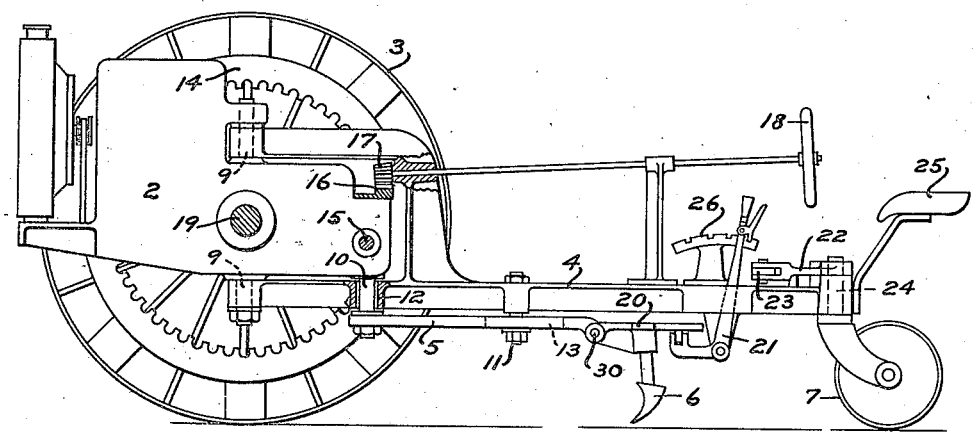
Figure 1 is a side elevation, partly in section, of a cultivator tractor of the so-called two front drive wheel type having the improved attachment applied thereto.

The vehicle or tractor to which I have applied my invention by way of illustration, is of the so-called frameless type, wherein the body 2 comprising rigidly united motor and transmission housings functions as a frame, thereby eliminating necessity of providing a special frame structure. Projecting laterally from the opposite sides of the body 2, are two horizontal alined stub axles 19 upon which the tractor guiding means or wheels 3 are rotatably mounted. The weight of the driving motor and of the transmission mechanism is practically balanced about the axis of the wheels 3, and the tractor is prevented from tilting forward and backward by means of a rearwardly extending horizontal beam or reach 4. The front portion of the reach 4 is bifurcated to form a yoke the bifurcations of which extend forwardly above and below the transmission housing and are secured to the body 2 by means of upright alined pivots 9 which lie in the vertical plane of the axle axis. The rear end of the reach 4 is T-shaped, being supported at a definite distance above the ground by means of two caster wheels 7 which are mounted in vertical pivot bearings 24.

The wheels 3 besides serving as the tractor guiding means, are the propelling medium of the vehicle, each wheel being provided with an annular internal gear 14 which is engaged by a pinion 27 secured to a horizontal driving shaft 15, the shafts 15 being associable with the propelling motor through a differential and transmission gearing in a well known manner. The rearwardly extending reach 4 is laterally swingable in a horizontal direction about the pivots 9 and relatively to the body 2, by means of a bevel pinion 17 carried by the reach 4 and coacting with a segmental rack 16 secured to the body 2, the pinion 17 being rotatable by means of the steering hand wheel 18. The hand wheel 18 and the motor controlling levers which have been omitted, are preferably mounted upon the rear portion of the reach 4 in convenient proximity to the operator's seat 25 which is also supported from the reach 4. The brackets of the caster wheels 7 may be provided with forwardly projecting arms 22 connected by a transverse link 23 as shown, in order to permit positive manual movement of the wheels 7 about the pivot bearings 24 when making short turns. A double foot lever 28 located within easy reach from the seat 25, is pivotally mounted upon the reach 4 and has a medial forwardly extending arm pivotally connected to a pin on the cross link 23. The caster wheels 7 are normally fixed against rotation about the vertical pivot bearings 24 by means of a removable locking pin 29 which holds the foot lever 28 and the associated elements against movement relatively to the beam or reach 4. Upon withdrawal of the pin 29, the wheels 7 are however freely swingable about the pivot bearings 24 by manipulation of the foot lever 28.

Figure 3:
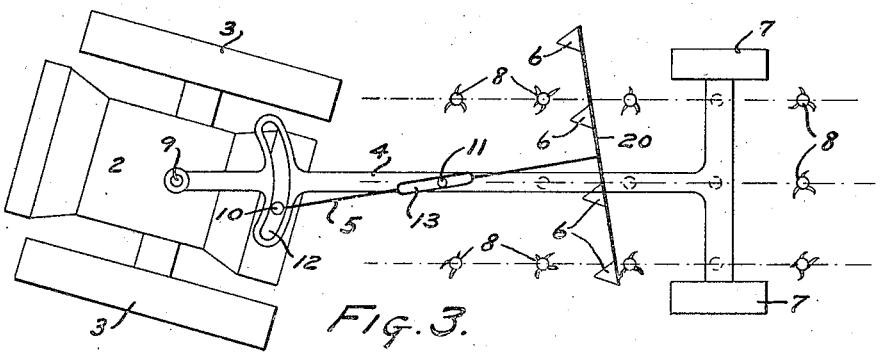
Figure 3 is a diagrammatic view illustrating the operation of my improved tractor attachment.

The implement or cultivator draft bar 5 is swingably connected to a rear portion of the body 2 by means of a vertical pivot 10 which is located to the rear of the vertical plane of the axle axis. In order to permit independent transverse swinging of the reach 4 and of the draft bar 5, the lower bifurcation of the former is provided with a segmental slot 12 through which the pivot 10 passes, the draft bar 5 being located below the reach 4. The draft bar 5 extends rearwardly from the pivot 10 and has a medial guide slot 13 through which a guide pivot pin 11 projects, the pin 11 being fixed to the reach 4. The cultivator cross bar 20 is secured to the rear end of the draft bar 5 by means of a horizontal transverse pivot 30, and has a series of equally spaced downwardly projecting members to which the shovels 6 are attached. The cross bar 20 is vertically tiltable to vary the depth of cultivation and to elevate the shovels 6 out of the ground, by means of an adjusting lever 21 pivoted to the reach 4 and manually lockable to a depth gaging segment 26. The manipulating portion of the lever 21 is located within easy reach from the operator's seat 25. The shovels 6 are spaced laterally so as to enable them to till the soil between parallel rows of plants 8 which are placed standard distances apart as shown in Fig. 3.

During operation of the combined vehicle and implement, the driving and guiding wheels 3 are propelled along the ground by means of power applied through the driving shafts 15 and pinions 27 to the annular internal gears 14. Normal steering of the vehicle is effected by manipulation of the steering hand wheel 18 which operates the pinion 17 coacting with the rack 16. When the hand wheel 18 is turned, the vehicle body 2 and the wheels 3 are swung laterally relatively to the reach 4, about the vertical pivots 9, thereby causing the forward wheels 3 to assume different angular positions in vertical planes relatively to the trailing caster wheels 7. Due to inaccuracies in the construction of vehicles of this kind in commercial quantities and for other reasons, relative displacement of the front and rear supporting wheels 3, 7 is also often caused by obstructions in the path of travel of one or more of the supporting wheels, thus producing irregularities in the course of travel of the machine. The irregularities in travel thus produced are often sufficiently pronounced to make them decidedly objectionable in certain classes of work such as cultivating between rows of plants 8. The plants 8 which may be corn or other vegetation, are usually set out in parallel straight rows which are equal standard distances apart. The tractor wheels 3, 7 are spaced apart definite distances which enable transportation of the vehicle over a field in a direction parallel to the rows of plants 8, without danger of injuring the plants, unless the course of travel of the machine is interfered with as hereinabove mentioned. The cultivator shovels 6 are likewise spaced apart definite distances so as to bring them into the spaces between the successive plant rows during normal operation of the machine, unless their course of travel is interfered with.

Figure 2:
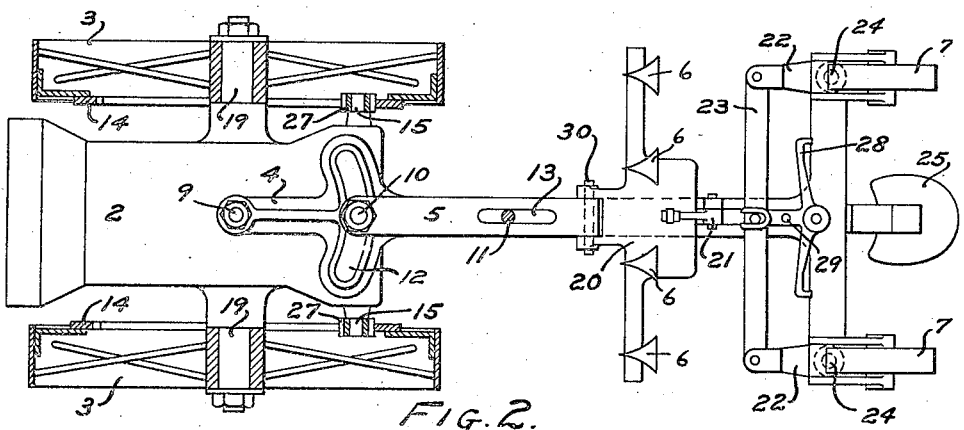
Figure 2 is a bottom part sectional view of the cultivator tractor and of the improved attachment.

With the arrangement of elements which I have illustrated in the drawing, the cultivator shovels 6 are properly positioned relatively to the plant rows when the front and rear wheels 3, 7 are parallel to each other as indicated in Figure 2. The draft bar 5 is then disposed parallel to the reach 4 and the pivots 9, 10, 11 all lie in a common vertical plane. If for any reason the front guiding wheels 3 are displaced as shown in Figure 3, the pivot 10 at the front end of the draft bar 5 is swung laterally out of the vertical plane of the pivots 9, 11 by virtue of the displacement of the rear portion of the tractor body 2, thereby causing the bar 5 to slide along and swing about the pivot 11 and moving the cultivator shovels 6 transversely of their normal direction of forward travel. If the front wheels 3 are swung in the opposite direction from that illustrated, the shovels 6 will likewise move in the opposite direction transversely of their normal path of travel. From this description it will be obvious that an operator positioned upon the seat 25, may direct his entire attention toward the proper location of the shovels 6 relatively to the plant rows, and that these shovels will automatically keep him constantly informed as to contemplated changes in the direction of travel of the tractor. When the shovels 6 move laterally in either direction, the operator immediately knows that the guiding wheels 3 have been displaced and he can quickly return these wheels to their normal position by manipulation of the steering wheel 18, thus making it possible for him to readily maintain the tractor wheels 3, 7 between the plant rows and avoiding injury to the individual plants 8.

It will be apparent that the operator is also informed as to the actual position of the shovels 6, by observation of the guiding wheels 3 alone, thus enabling him to operate the combined unit between slightly irregular rows of plants 8 without danger of injuring the plants. The depth of cultivation may be readily controlled by manipulation of the lever 21, and the shovels 6 may be elevated completely out of the soil when it is desired to make a short turn. The slot 12 in the reach 4 is necessary only when the reach extends forwardly between the body 2 and the draft bar 5 as illustrated, and the slot 13 may be formed either in the reach 4 or in the draft beam 5, the pivot 11 in either case being secured to the unslotted element and extending through the slot in the other element. The attachment is readily applicable to any of the standard farm tractors and may also be used with tractors of the type wherein the operator walks instead of riding as in the machine disclosed, as well as to other types of vehicles.

While I have disclosed my invention as applied to a specific type of tractor and as embodying certain details of construction, I do not desire to have the scope thereof limited by such specific disclosure, as various modifications within the scope of the appended claims, may occur to persons skilled in the art.

I claim:

1. In combination, a vehicle having a reach associated therewith, means for relatively laterally swinging said vehicle and said reach about a vertical axis, a draft bar swingable laterally relatively to said vehicle about another axis and independently of said reach, a pivotal connection between said reach and said bar, and an implement associated with said bar.

2. In combination, a vehicle having a reach associated therewith, means for relatively laterally swinging said vehicle and said reach about a vertical axis, a draft bar swingable laterally relatively to said vehicle about another vertical axis and independently of said reach, a pivotal connection between said reach and said bar located on the side of said bar axis remote from said reach axis, and an implement associated with said bar.

3. In combination, a vehicle having wheels on opposite sides thereof and a reach associated with said vehicle by means of a vertical pivot whose axis lies in the vertical plane of the axis of said wheels, a draft bar pivotally associated with said vehicle to the rear of said reach pivot, a pivotal connection between said reach and said bar, and an implement attached to said bar, the axes of said three pivotal unions normally lying in a common vertical plane.

4. In combination, a vehicle having a reach vertically pivotally connected thereto, a draft bar pivotally associated with said vehicle at a place remote from the pivot of said reach, a pivotal connection between said reach and said bar, and an implement attached to said bar, the axes of said three pivotal unions normally lying in a common vertical plane.

5. In combination, a vehicle having a reach vertically pivotally connected thereto, a draft bar vertically pivotally connected to said vehicle at a point remote from the pivot of said reach, a combined vertical pivotal and horizontally slidable connection between said reach and said bar, and an implement attached to said bar.

6. In combination, a vehicle having wheels on opposite sides thereof and a reach vertically pivotally connected to said vehicle in the vertical plane of the axis of said wheels, a draft bar vertically pivotally connected to said vehicle to the rear of said plane, a combined vertical pivotal and horizontally slidable connection between said reach and said bar, and an implement attached to said bar.

7. In combination, a motor vehicle comprising a pair of front motor propelled steering wheels swingable about a vertical pivot and a laterally movable member extending rearwardly therefrom, a draft bar connected to said vehicle to the rear of said pivot by means of a second vertical pivot, a third vertical pivot connecting said bar and said member, and an implement attached to said bar.

8. In combination, a motor vehicle comprising a pair of front motor propelled steering wheels swingable about a vertical pivot and a member extending rearwardly therefrom, a draft bar connected to said vehicle by means of a second vertical pivot, an implement attached to said bar, and a third pivot connecting said bar and said member, said three pivots normally lying in a common plane.

9. In combination, a motor vehicle comprising a pair of motor propelled steering wheels swingable about a vertical pivot and a member extending rearwardly therefrom, a draft bar connected to said vehicle to the rear of said pivot by means of a second vertical pivot, an implement attached to said bar, and a third vertical pivot connecting said bar and said member to the rear of said second pivot, said three pivots normally lying in a common plane.

In testimony whereof I have hereunto affixed my signature.

ARTHUR J. LIEDTKE.